United States Patent [19]

Kuno et al.

[11] Patent Number: 5,056,038
[45] Date of Patent: Oct. 8, 1991

[54] APPARATUS FOR EFFECTING COORDINATED POSITION/FORCE CONTROL FOR A MANIPULATOR

[75] Inventors: Toshitaka Kuno; Mitsuo Koide, both of Aichi, Japan

[73] Assignee: Kabushiki Kaisha Toyota Chuo Kenkyusho, Aichi, Japan

[21] Appl. No.: 527,367

[22] Filed: May 23, 1990

[30] Foreign Application Priority Data

May 25, 1989 [JP] Japan .................. 1-132145

[51] Int. Cl.$^5$ ...................... G06F 15/46; G05B 19/42
[52] U.S. Cl. .................................. 364/513; 364/165
[58] Field of Search ............... 364/513, 165; 73/862.4

[56] References Cited

U.S. PATENT DOCUMENTS

| | | |
|---|---|---|
| 4,808,063 | 2/1989 | Haley . |
| 4,860,215 | 8/1989 | Seraji .................................. 364/165 |
| 4,974,210 | 11/1990 | Lee .................................. 364/513 |

FOREIGN PATENT DOCUMENTS

| | | |
|---|---|---|
| 0269373 | 1/1988 | European Pat. Off. . |
| 0280324 | 8/1988 | European Pat. Off. . |
| 61-7905 | 1/1986 | Japan . |
| 62-125410 | 6/1987 | Japan . |
| 0112309 | 1/1989 | Japan . |
| 88/04446 | 4/1988 | World Int. Prop. O. . |

Primary Examiner—Allen R. MacDonald
Assistant Examiner—George Davis
Attorney, Agent, or Firm—Oblon, Spivak, McClelland, Maier & Neustadt

[57] ABSTRACT

A force and moment which a manipulator receives from an external environment is detected, and this detected value is multiplied by a gain inversely proportional to a virtual spring constant set by a tool coordinate system, and the product is further converted to a value in each joint coordinate system of the manipulator so as to determine a detection torque. A command value of force and moment is converted to a value in each joint coordinate value of the manipulator in the same way as described above, so as to determine a command torque. A difference between a position command value and a position detection value is multiplied by a virtual spring constant in each joint coordinate system of the manipulator obtained by converting the virtual spring constant, and a differential torque is obtained by converting the aforementioned difference to a force and moment corresponding to the difference. A targeted torque is determined by adding the command torque and the differential torque, and feedback control is effected such that the detected torque of each joint of the manipulator coincides with the targeted torque.

23 Claims, 7 Drawing Sheets

APPARATUS FOR EFFECTING COORDINATED POSITION/FORCE CONTROL FOR A MANIPULATOR

BACKGROUND OF THE INVENTION

1. Field of the Invention

The present invention relates to an apparatus for effecting coordinated position/force control for a manipulator and, more particularly, to an apparatus for effecting coordinated position/force control for a manipulator which is suitable for effecting force control.

2. Description of the Related Art

Hitherto, most conventional robots have been able to effect only the position control. For this reason, in order to allow a robot to move or effect a fixing operation or the like in compliance with an object, the operation is usually performed by devising a measure such as the provision of a tool clamped by the robot with a certain compliance mechanism. With this method, it is necessary to prepare various kinds of tools and replace the tools in correspondence with the operation. Consequently, the manufacturing cost is high, and the operation time for the tool replacement is needed. In addition, there are cases where position-control type robots cannot effect operations depending on the type of operations.

If robots are provided with a force controlling mechanism in the same way as a human arm, it is possible to remarkably expand the applicable range of operation for the robots. Hence, various force controlling systems have hitherto been proposed. One such example is shown in FIG. 2 (Japanese Patent Laid-Open No. 7905/1986). In this control system, the movement of a robot hand to be realized is set by means of parameters including a virtual spring constant, a coefficient of viscosity, and mass, a velocity command value in a hand coordinate system is determined, this command value is converted to a velocity command value for each joint by using an inverse-Jacobian matrix, and each joint is moved such that its velocity ultimately becomes this velocity command value. In addition, a control method shown in FIG. 3 has also been proposed (Proceedings of 19th IEEE Conf. on Decision and Control, 1980, pp. 95–100). In this case, the movement of a hand to be realized is set by a spring constant in a hand coordinate system, a torque command value for each joint necessary for this movement is determined, and each joint is driven on the basis of the command value.

In neither system of FIGS. 2 and 3, a position control loop and a force control loop are completely separated from each other, so that there has been the drawback that when the position control is effected, the force control loop affects the operation, thereby aggravating the position control accuracy. On the other hand, when the force control is conducted, the position control loop affects the operation, thereby aggravating the force control accuracy.

Furthermore, the securing of stability is also a major task in force control robots. One factor causing instability is a disturbing force. A force which is produced as a processing tool or a gripping tool connected to a terminal of a force sensor and an inertial load of a workpiece undergo movement is also input to the force sensor and constitutes a disturbing force, thereby making the control system for the force control unstable. As a result, there has been the problem that even a component which is effecting the positional control also becomes unstable.

Accordingly, a force controlling system shown in FIG. 4 has been proposed as a technique for completely separating the position control loop and the force control loop from each other (Journal of Dynamic Systems, Measurement & Control, 102, June 1981, pp. 126–133). Namely, each control mode for the position and force with respect to each component in a hand coordinate system is designated by a selected matrix, and either the position control or the force control is thereby designated completely. With this control system, however, since a changeover between the position control and the force control is discontinuous, there has been the problem that a shock is produced at the time of the changeover. The force control can be effected for the first time when a tool end is brought into contact with an object of operation. For this reason, it is preferred that the tool is moved under position control up to a starting point of the operation, and the operational mode is gradually changed over to the force control at the beginning of the contact. On the other hand, at the time of completion of the force operation, it is preferred that the operational mode is gradually changed over to the position control as the portion of contact is separated from the object of operation. With the control system such as the one shown in FIG. 4, however, it has been impossible to effect such movement.

With conventional force controlling robots, the difficulty of securing stability has also been a major drawback. Causes of instability include a delay in a spring-mass system present in a transmission system of the manipulator, as well as vibrations that are produced in that system. No consideration has been given to this respect with the conventional force controlling robots.

In addition, although robots which effect the force control in most cases perform operations with their hand portion abutting a certain external environment, there has been the drawback that if a spring constant, i.e., hardness, of the abutting object changes, the loop gain of the force loop also changes, resulting in instability. No consideration has been given to this respect as well with the conventional force controlling robots.

SUMMARY OF THE INVENTION

Accordingly, a primary object of the present invention is to provide an apparatus for effecting coordinated position/force control for a manipulator which is stabilized and capable of effecting a high-precision operation, thereby overcoming the above-described drawbacks of the conventional position and force controlling system for a manipulator. In other words, an attempt is made to effect a high-precision and stabilized operation of the control system by ensuring that a force feedback component which is the same component as a component effecting position control and is unnecessary for that component effecting position control will not function.

Another object of the present invention is to provide an apparatus for effecting coordinated position/force control for a manipulator which is capable of continuously change the manner of coordination between a position and a force although separation between the position and the force is effected more strictly, and of effecting a smooth switch without causing a shock at the time of the shift.

Still another object of the present invention is to provide an apparatus for effecting coordinated position/force control for a manipulator which is capable of sharply reducing a gain concerning a frequency component exceeding a bandwidth necessary for control with respect to a component which is effecting force control, thereby preventing a control system from becoming unstable due to vibrations occurring due to a spring-mass system and the like of a transmission system.

A further object of the present invention is to provide an apparatus for effecting coordinated position/force control for a manipulator which is capable of preventing a frequency component exceeding a necessary bandwidth from entering a force control loop with respect to a change in the hardness of an object so that a loop gain of a force loop in a high-frequency component will not change, thereby stabilizing a control system.

A still further object of the present invention is to provide an apparatus for effecting coordinated position/force control for a manipulator in which a tool coordinate system is established in a tool section, a spring constant to be realized by the tool can be set by this tool coordinate system, the velocity feedback can also be effected by the tool coordinate system, and characteristics of the motion of the tool coordinate system can be established, so as to facilitate the operation and teaching.

To these ends, in accordance with the present invention, there is provided an apparatus for effecting coordinated position/force control for a manipulator, comprising: manipulator driving means for driving each joint of the manipulator; force detecting means for detecting in a tool coordinate system at least one of a force and moment which the manipulator receives from an external environment; hand force variable-gain computing means for providing arithmetic processing for changing a gain in response to a degree of coordination between a position and a force with respect to an output of the force detecting means; output-torque converting means for converting an output of the hand force variable-gain computing means to at least one of the force and moment in each joint coordinate system of the manipulator; force commanding means for sending a force command signal in which at least one of the force and moment is expressed by the tool coordinate system; command force variable-gain computing means for providing arithmetic processing for changing the gain in response to a degree of coordination between the position and the force with respect to a force command signal sent from the force commanding means; command-torque converting means for converting an output of the command force variable-gain computing means to at least one of the force and moment in each joint coordinate system of the manipulator; position detecting means for detecting the position of each joint of the manipulator; position commanding means for sending a command position of each joint of the manipulator; positional deviation detecting means for detecting a positional deviation which is a difference between the position detected by the position detecting means and the command position sent by the position commanding means; positional deviation-torque converting means for converting a virtual spring constant set by the tool coordinate system in response to a degree of coordination between the position and the force to a virtual spring constant in each joint coordinate system of the manipulator, and for converting the positional deviation to at least one of the force and moment corresponding to the positional deviation on the basis of the converted virtual spring constant and the positional deviation detected by the positional deviation detecting means; and feedback compensation computing means for computing a command value for at least one of the force and moment for the manipulator driving means on the basis of at least one of the force and moment converted by the command-torque converting means, at least one of the force and moment converted by the positional deviation-torque converting means, and at least one of the force and moment converted by the output torque converting means.

At least one detection value of the force and moment detected by the detecting means is subjected to arithmetic processing for changing a gain in response to a degree of coordination between the position and the force by means of the hand force variable-gain computing means, and is converted to a value in each joint coordinate system of the manipulator by means of the output-torque converting means.

A command signal sent from the force commanding means is subjected to the same arithmetic processing as that of the hand force variable-gain computing means by means of the command force variable-gain computing means, and is converted to a value in each joint coordinate system of the manipulator by means of the command-torque converting means.

The positional deviation detecting means computes a difference between the detected position and the command position. The positional deviation-torque converting means effects a conversion to at least one of the force or moment corresponding to the positional deviation on the basis of the positional deviation and the virtual spring constant in each joint coordinate system of the manipulator determined by converting the virtual spring constant set by the tool coordinate system in response to the degree of coordination between the position and the force.

The feedback compensation computing means computes a command value to be sent to the manipulator driving means on the basis of an output of the output-torque convert means, an output of the command-torque converting means, and an output of the positional deviation-torque converting means.

In accordance with the present invention, since the virtual spring constant is established by the tool coordinate system in response to a degree of coordination between the position and the force, it is possible to continuously change the manner of coordination between the position and the force in the tool coordinate system. In consequence, it is possible to effect a smooth change without causing a shock at the time of the shift, and after the shift the position controlling component is less susceptible to the effect of the force controlling component, thereby effecting a high-precision operation and stable operation of the control system. With respect to a component which is effecting the force control, by allowing the gain of a frequency component exceeding a bandwidth necessary for control to be dropped sharply, it is possible to prevent the control system from becoming unstable due to vibrations caused by a spring-mass system and the like of the transmission system.

In addition, even when the hardness of an object against which the tool and the like abut changes suddenly, it is possible to maintain the stability.

Furthermore, since the virtual spring constant, the velocity feedback coefficient and the like can be established by the tool coordinate system for actually effecting an operation, it is readily possible to set such parameters. Moreover, the setting can be effected without depending on the configuration of the manipulator.

Since the servo of each axis is provided with a torque loop, it is possible to expect more speedy response characteristics as compared with a servo using a position loop and a velocity loop.

In addition, there is an advantage in that calculation is rendered simple since an inverse-Jacobian matrix is not required in this control system.

The above and other objects, features and advantages of the invention will become more apparent from the following description of the invention when read in conjunction with the accompanying drawings.

DESCRIPTION OF THE PREFERRED EMBODIMENTS

Figure 1:
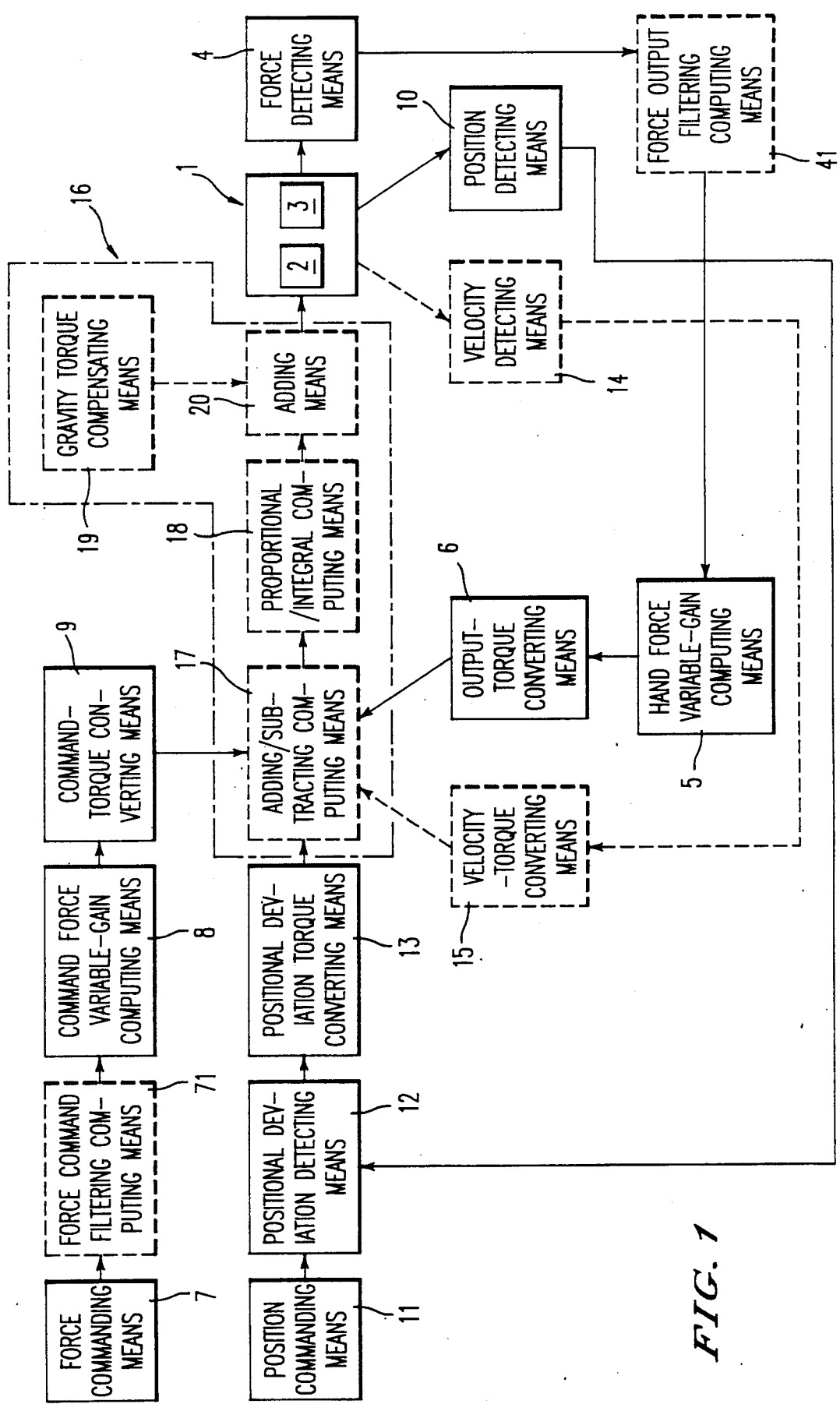
FIG. 1 is a block diagram in accordance with embodiments of the present invention.
Figure 2:
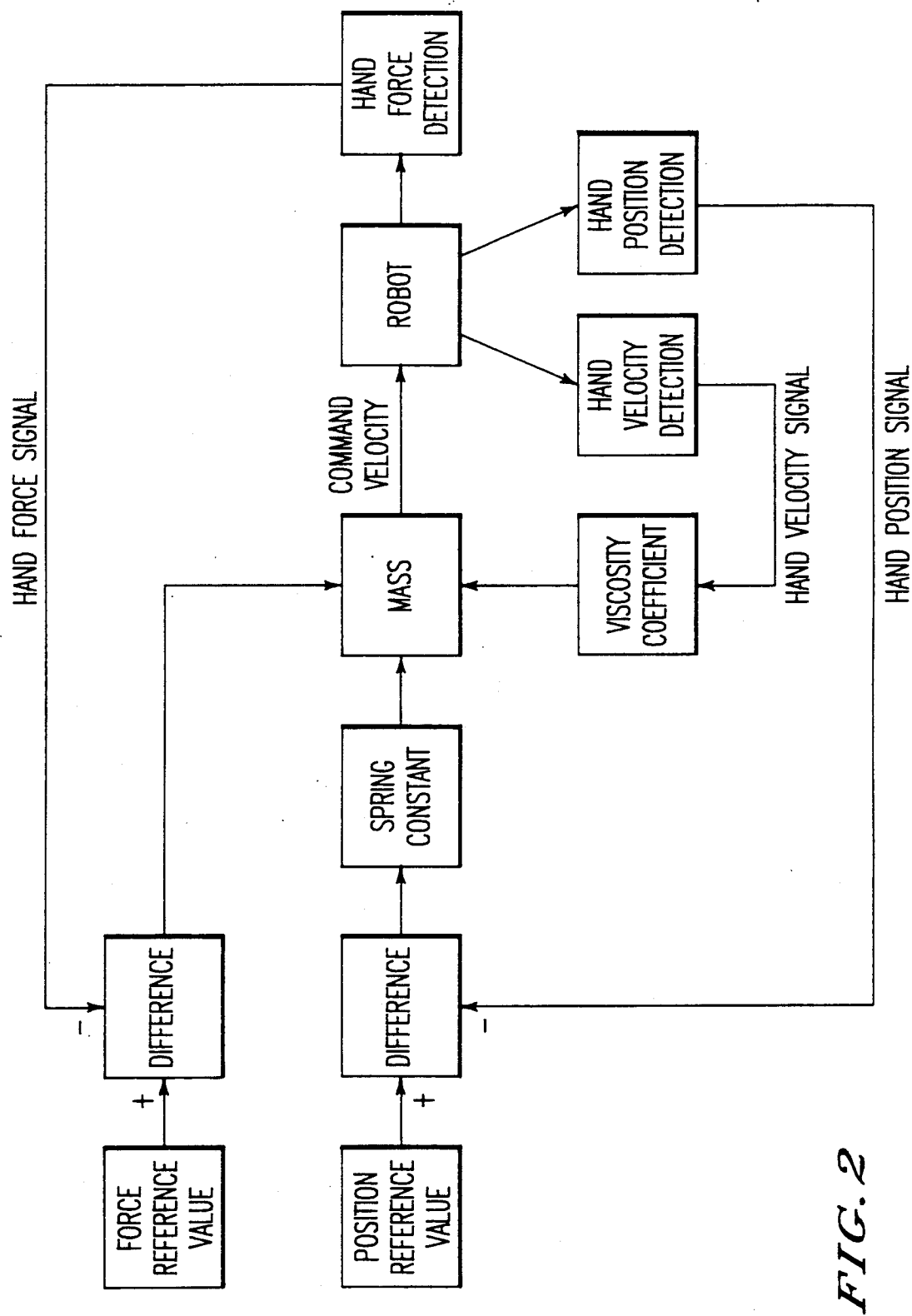
FIGS. 2 to 4 are block diagrams of conventional manipulator controllers.
Figure 3:
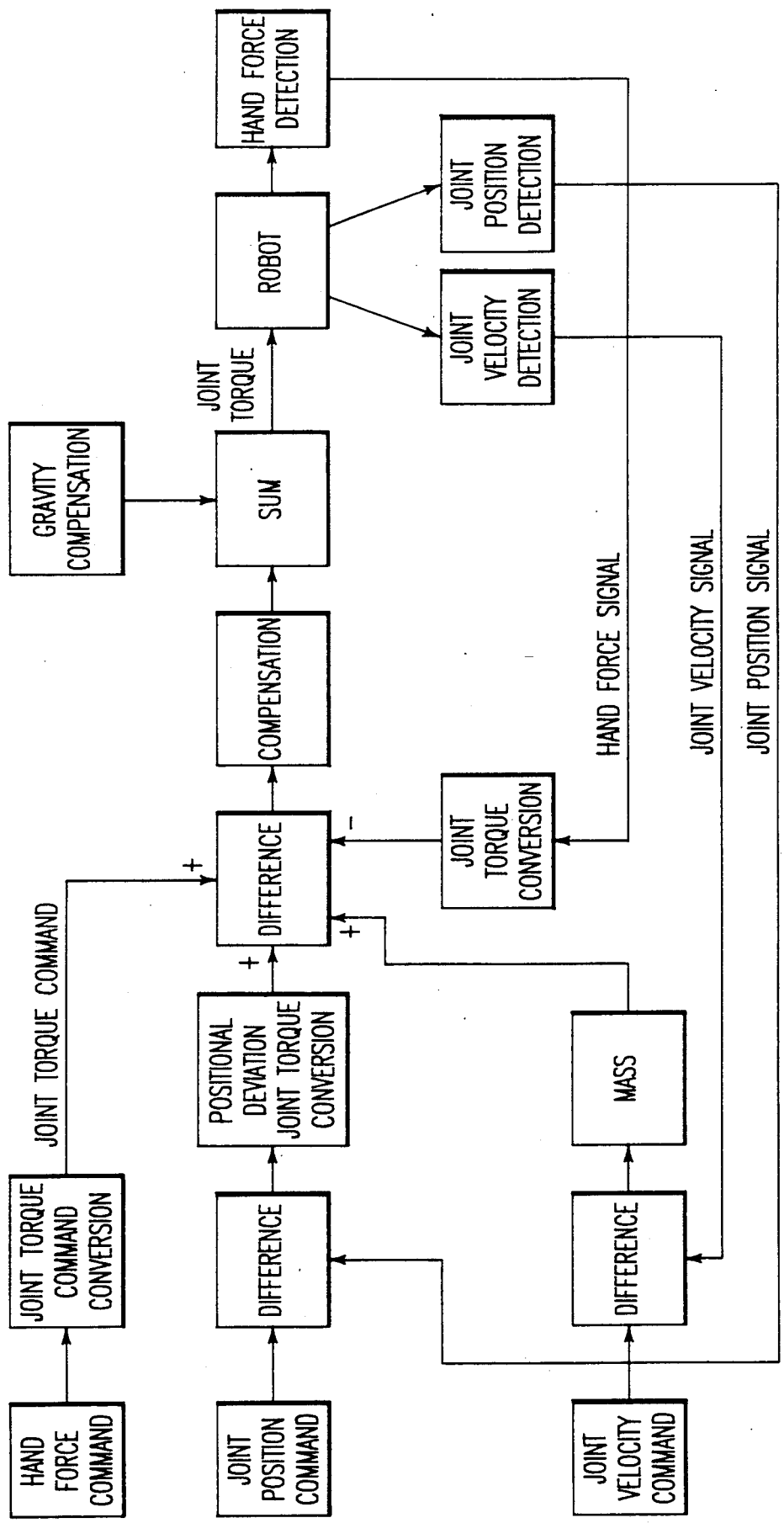
Figure 4:
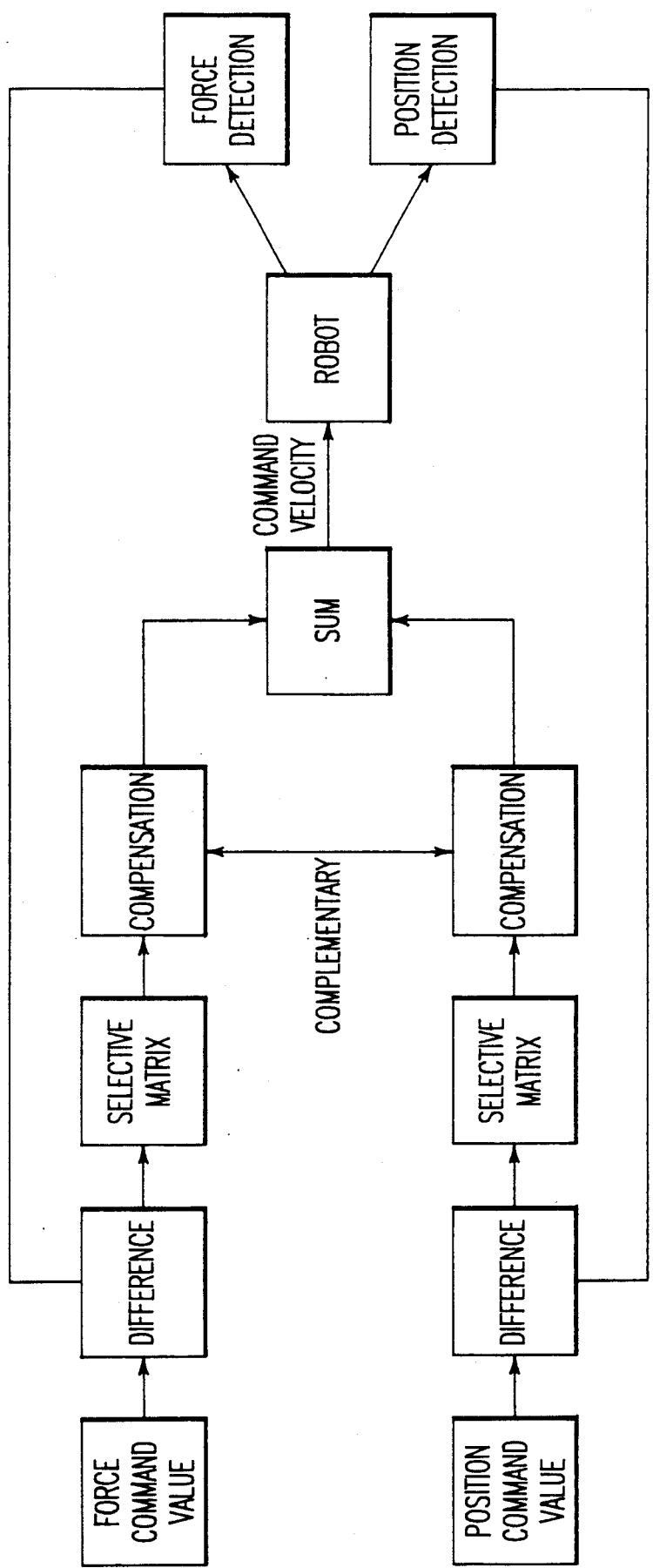

Referring now to FIG. 1, a description will be given of a first embodiment of the present invention. In FIG. 1, an illustration is given by combining the means employed in this embodiment with the means indicated by broken lines and belonging to second and third embodiments, which will be described later.

A manipulator section 1 comprises a manipulator driving means 2 for driving each joint of a manipulator and an arm section 3. Disposed at a distal end of the arm section 3 is a force detecting means 4 for detecting at least one of a force and moment which the manipulator receives from an external environment, i.e., either the force or moment or both of them, by means of a tool coordinate system. In addition, a hand force variable-gain computing means 5 is provided for subjecting an output of the force detecting means 4 to arithmetic processing for changing the gain in response to the degree of coordination between the position and the force. In this hand force variable-gain computing means 5, in the case of the force control mode, for instance, the degree of separation between the position control and the force control by effecting computation in such a manner as to lower the gain with respect to a component in the position control mode, so that the position control and the force control can be effected more accurately. In addition, an attempt is made to prevent a position controlling component from becoming unstable owing to a force outputting feedback signal.

The degree of coordination between the position and the force can be varied by increasing or decreasing a virtual spring constant for the component in each direction in the tool coordinate system. The gain of the hand force variable-gain computing means 5 is increased or decreased in correspondence with the increase or decrease of this spring constant. In the case of the position control mode, the gain is reduced in such a manner that the force feedback gain of the component with a large virtual spring constant, i.e., the component for which position control is to be effected more heavily, becomes small. In the case of the force control mode, on the other hand, the gain is increased in such a manner that the virtual spring constant for which the force control is to be effected becomes small, while the force feedback gain of a corresponding force controlling component becomes large. Various types of patterns are conceivable as the method of increasing or decreasing the force feedback gain, and may be set in such a manner as to be in the relationship of reverse proportion to the virtual spring constant, for instance.

An output-torque converting means 6 converts either a force or moment, or both, in the tool coordinate system to either a force or moment, or both, in each joint coordinate system of the manipulator by multiplying an output from the hand force variable-gain computing means 5 by a Jacobian transposed matrix, for instance.

A force commanding means 7 sends a force command signal in which either a force or moment, or both, are expressed by the tool coordinate system.

A command force variable-gain computing means 8 provides the force command signal sent from the force commanding means 7 with arithmetic processing for converting the gain in response to the degree of coordination between the position and the force. The command force variable-gain computing means 8 conducts similar computation to that effected by the hand force variable-gain computing means. This is to make the level of the command value identical with the level of the feedback signal.

A command-torque converting means 9 converts the output from the command force variable-gain computing means 8 to either the force or moment, or both, in each joint coordinate system of the manipulator by multiplying that output by a Jacobian transposed matrix, for instance.

The position of each joint of the manipulator is detected by a position detecting means 10.

A command position of each joint of the manipulator is sent by a position commanding means 11.

A positional deviation detecting means 12 detects a positional deviation which is determined as a difference between the position signal output from the position detecting means 10 and the command position output from the position commanding means 11.

A positional deviation-torque converting means 13 converts a virtual spring constant set in the tool coordinate system to a virtual spring constant in each joint coordinate system of the manipulator in response to the degree of coordination between the position and the force, and converts the positional deviation to either a force or moment, or both, corresponding to the positional deviation on the basis of the virtual spring constant thus converted and the positional deviation output from the positional deviation detecting means 12.

A feedback compensation computing means 16 effects computation for feedback compensation in such a manner that a sum of an output of the command-torque converting means 9 and an output of the positional deviation-torque converting means 13 will coincide with an output of the output-torque converting means 6.

That is, when a deviation is produced between the sum of the output of the command-torque converting means 9 and an output of the positional deviation-torque converting means 13 on the one hand, and the output of the output-torque converting means 6 on the other, a command value of at least one of the force and moment for operating the manipulator driving means 2 of each joint of the manipulator is computed and output in such a manner as to subtract that deviation, and is then output to the manipulator driving means 2 of each joint of the manipulator.

Finally, the arm section 3 of each joint of the manipulator is driven by the driving means of each joint in a direction in which the aforementioned deviation is decreased. With respect to the component of the force control mode with a small virtual spring constant, the arm section 3 operates in such a manner as to attempt to produce at the tool end at least one of the force and moment so as to allow the same to coincide with at least the command value of either the force or moment. With respect to the component of the position control mode having a large virtual spring constant, the arm section 3 operates in such a manner as to coincide with a position command value.

In addition, in a case where the virtual spring constant is an intermediate value, the arm section 3 attempts to move up to a point at which at least either one of the force and moment corresponding to the positional deviation is set in equilibrium. In other words, it becomes possible for the arm section 3 to undergo a motion as if the manipulator is supported by springs.

Figure 5:
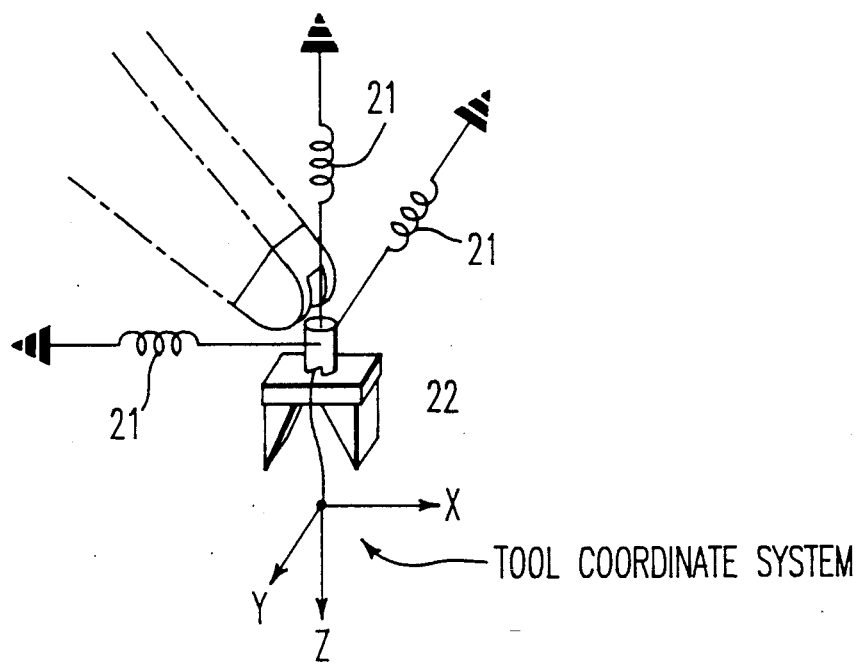
FIG. 5 is a perspective view illustrating a virtual spring.

By using the control system shown in FIG. 1, spring constants which are to be realized by the tool can be established in the tool coordinate systems set in the tool or the like mounted on the hand end of the manipulator, and a stable motion as if the tool is provided with springs becomes possible. In other words, in the arrangement provided, a tool 22 is supported by virtual springs 21, as shown in FIG. 5, and a spring constant (the reciprocal of a compliance) of each of these virtual springs can be set arbitrarily.

A description will now be given of other embodiments by focusing on differences with the above-described first embodiment.

A second embodiment is characterized in that a force output filtering computing means 41 for allowing only a low-frequency component of the output of the force detecting means 4 to be passed is interposed between the force detecting means 4 and the hand force variable-gain computing means 5, and that a force command filtering computing means 71 for allowing only a low-frequency component of the output of the force commanding means 7 to be passed is interposed between the force commanding means 7 and the command force variable gain computing means 8.

In other words, the force output filtering computing means 41 is further connected between the force detecting means 4 and the hand force variable-gain computing means 5. A spring-mass system is generally present in a transmission system of a manipulator, so that there occurs a delay of the spring-mass system or vibrations of that system, thereby rendering the control system unstable. The intrinsic frequency of this transmission system is several dozens Hz in a general manipulator, and since the frequency bandwidth necessary for the force control is generally several Hz, it is possible to stabilize the control system by providing a low-pass filter for cutting off a frequency component exceeding the several Hz.

In addition, even if the hardness of the object being in contact with the hand portion changes abruptly, since the frequency component exceeding the necessary bandwidth is prevented from entering the force controlling loop, the loop gain of the force controlling loop in the high-frequency component does not change, thereby making it possible to stabilize the force controlling system. With respect to the bandwidth of a low-frequency component, the force controlling system is in a range in which it is capable of sufficiently responding to that bandwidth, so that the force controlling system does not become unstable.

Since the insertion of the low-pass filter leads to a reduction in the response characteristics of the control system, there is no need for the insertion in cases where stability is obtained without any filtering. In addition, better response characteristics are obtained if the cut-off frequency is as practically high as possible in a stable range.

The force command filtering computing means 71 for effecting computation similar to that of the force output filtering computing means 41 may also be inserted between the force commanding means 7 and the command force variable-gain computing means 8. This is designed to delay the command value by an amount corresponding to that of the feed back signal.

As a result, when low-pass filtering processing is effected in the force controlling loop, the force controlling system can be stabilized substantially, thereby allowing the force controlling system to be less susceptible to the effect of a delay of the spring-mass system of the transmission system as well as a change in the hardness of the object.

A third embodiment is characterized by further comprising the velocity detecting means 14 for detecting the velocity of each joint of the manipulator, as well as a velocity-torque converting means 15 for converting a velocity feedback gain set in the tool coordinate system to a velocity feedback gain at each joint of the manipulator and for converting the velocity to at least one of the force and moment on the basis of the velocity feedback gain thus converted and the velocity detected by the velocity detecting means 14, wherein the aforementioned feedback compensation computing means 16 is adapted to compute a command value of at least one of the force and moment for the manipulator driving means on the basis of at least one of the force and moment converted by the command-torque converting means, at least one of the force and moment converted by the positional deviation-torque converting means, at least one of the force and moment converted by the output-torque converting means, and at least one of the force and moment converted by the velocity-torque converting means.

When the force control of a general manipulator is conducted only by the viscosity inherent in the driving system of the manipulator, an attenuation shortage occurs in many cases, and vibrations and oscillations take place. Hence, vibrations and oscillations are suppressed by providing an attenuation term in terms of software by providing a velocity feedback.

In other words, the velocity of each joint of the manipulator is detected by the velocity detecting means 14.

The velocity-torque converting means 15 converts the velocity feedback gain set in the tool coordinate system to the velocity feedback gain at each joint of the manipulator and converts the velocity to either the force or moment, or both, corresponding to the velocity on the basis of the converted velocity feedback gain and the velocity signal output from the velocity detecting means 14.

An output from the velocity-torque converting means 15 is subtracted from a sum of the output of the command-torque converting means 9 and the output of the positional deviation-torque converting means 13, so that a velocity feedback corresponding to the velocity will be effected. For instance, the feedback compensation computation can be effected if the feedback compensation computing means 16 is constituted by an addition/subtraction computing means 17 and a proportion/integration computing means 18, if the addition/subtraction computing means 17 adds a command for the force or moment, or both, output from the command-torque converting means 9 and a command for the force or moment, or both, corresponding to the positional deviation output from the positional deviation-torque converting means 13, subtracts a signal of the force or moment, or both, output from the output-torque converting means 6 and a signal of the force or moment, or both, corresponding to the velocity output from the velocity-torque converting means 15, and if the proportion/integration computing means 18 effects proportional and integral processing or proportional, integral and differential processing with respect to a difference output from the addition/subtraction computing means 17 so as to obtain a command value of the force or moment, or both, for the driving means of each joint of the manipulator.

Although the velocity detecting means 14 and the velocity-torque converting means 15 are necessary when effecting a velocity feedback, it is not particularly necessary to provide these means when vibrations and oscillations do not occur without this feedback. In this case, the signal of the force or moment, or both, corresponding to the velocity output from the velocity-torque converting means 15 is not subtracted.

If the velocity feedback is effected as described above, it is possible to set velocity feedback coefficients in the tool coordinate system, so that the dynamic characteristics of the tool in the tool coordinate system can be set, thereby facilitating the operation and teaching.

Figure 6:
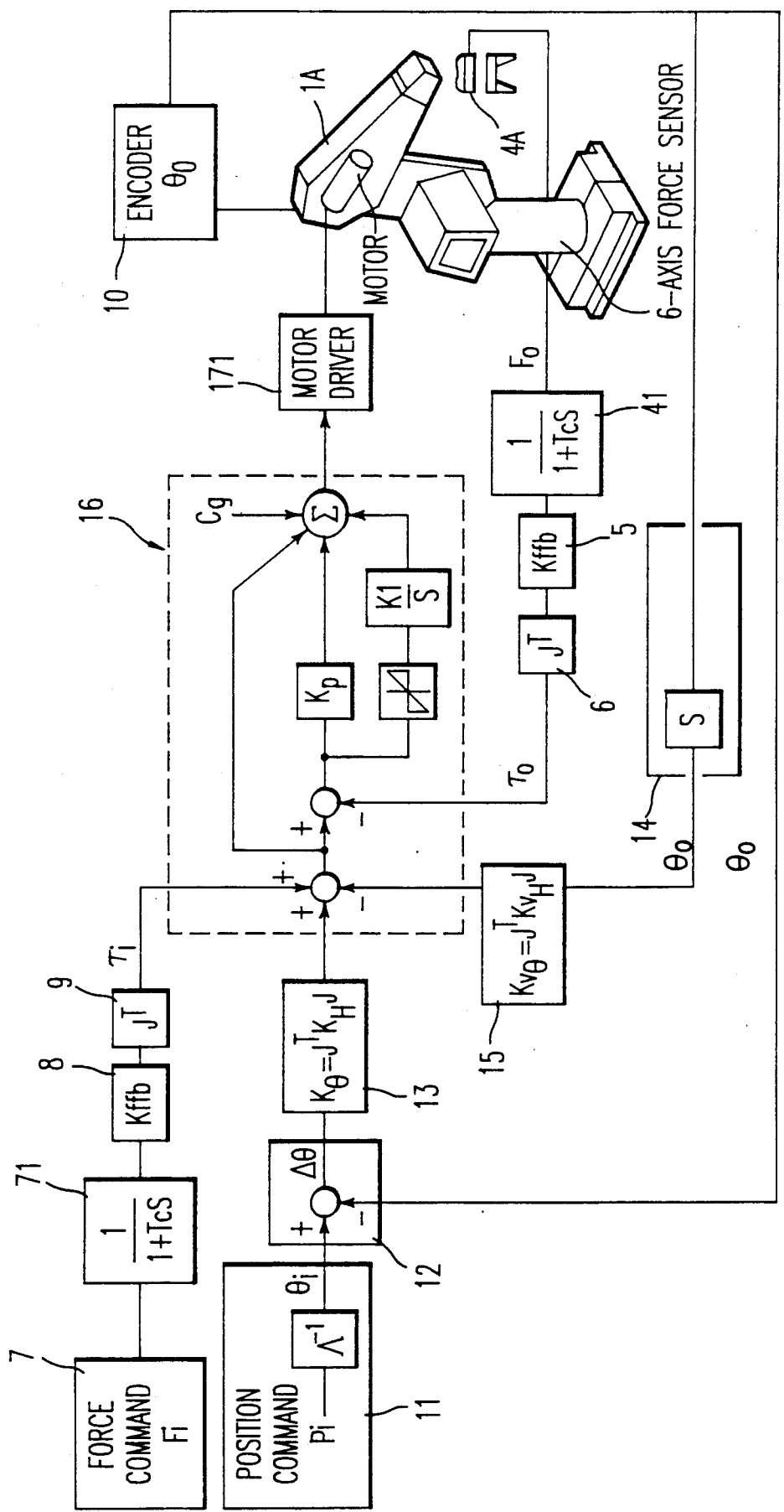
FIG. 6 is a block diagram of another embodiment of the present invention.

Referring now to FIG. 6, a description will be given of a fourth embodiment of the present invention.

In FIG. 6, a 6-axis force sensor 4A for measuring a reaction of the tool portion is mounted on a wrist portion of a 6-axis manipulator 1A. An output of the force or moment, or both, of the 6-axis force sensor 4A is subjected to filtering by the force output filtering computing means 41 for cutting off a signal exceeding a necessary frequency bandwidth so as to increase stability. For instance, a first-order lag filter which is the simplest as a low-pass filter is used as the force output filtering computing means 41, it suffices to effect computation in which an output h(s) and an output f(s) have the following relationship:

$$f(s) = \frac{1}{1 + Tc \cdot s} h(s) \quad (1)$$

where s indicates a Laplace transformation, and Tc indicates a time constant. The time constant Tc can be set arbitrarily for each component in correspondence with a frequency to be cut off.

The output of the force or moment, or both, in the tool coordinate system subjected to filtering by the force output filtering computing means 41 is then multiplied by a feedback gain Kffb by the hand force variable-gain computing means 5 so as to improve a separation between the force loop and the position loop. For instance, by using a virtual spring constant KH and a separation parameter FBFCT for determining a degree of separation between the force control and the position control, the feedback gain Kffb can be set as follows:

$$Kffb = \frac{FBFCT}{KH + FBFCT} \quad (2)$$

In other words, at the time of the force control mode with KH=0, then Kffb=1, and a 100% force feedback is effected, but KH becomes large. Namely, as the mode is shifted to the position control mode, Kffb becomes small (<1), so that the force feedback ceases to be effected. The magnitude of the separation parameter FBFCT can be set by the user arbitrarily for each component in relation to the virtual spring constant KH.

Here, the spring constant indicates the relationship between the force and the displacement, and if it is assumed that an effective spring constant realized at the force sensor end is KH', the force received by the sensor is F', and the displacement is ΔP', then we have $$KH' = \frac{F'}{\Delta P'}$$

Since the virtual spring constant KH acts on a force F obtained by multiplying F' by Kffb, so that $$KH = \frac{F}{\Delta P'} = \frac{F' \cdot Kffb}{\Delta P'}$$
$$= \frac{F'}{\Delta P'} \cdot Kffb = KH' \cdot Kffb$$

Hence, the effective spring constant KH' becomes $$KH' = KH \cdot \frac{1}{Kffb}$$

In addition, if the magnitude of the virtual spring constant KH is varied continuously, it is possible to effect a smooth switch without producing any shock at the time of the switch, and it is possible to ensure that, even after the switch, the effect of the force control mode is made less during the position control mode by multiplying the feedback gain Kffb.

The output from the hand force variable-gain computing means 5 is then converted to the force or moment, or both, in each joint coordinate system of the manipulator by the output-torque converting means 6 for multiplying that output by a transposed matrix $J^T$ of a Jacobian matrix J which is determined by the present position and posture of the manipulator.

The force commanding means 7 sends a force command signal in which the force or moment, or both, are expressed by the tool coordinate system.

The force command signal representative of the force command or moment command, or both, from the force commanding means 7 is provided with the same computation as that of the force output filtering computing means 41 by the force command filtering computing means 71 so as to allow only a low-frequency component to be passed. This is to delay the command value in the same way as the delay of the force feedback.

The command force variable-gain computing means 8 effects the same computation as that of the hand force variable-gain computing means 5 with respect to the force command signal sent from the force command filtering computing means 71 so as to multiply that force command signal by a force feedback gain corresponding to the magnitude of the virtual spring constant. This is to ensure that the magnitude of the force feedback becomes identical with that of the command value.

The command-torque converting means 9 effects the same computation as that of the output-torque converting means 6 by using the Jacobian transposed matrix $J^T$, and converts the output from the command force variable-gain computing means 8 to a command value of the force or moment, or both, in each joint coordinate system of the manipulator.

The detection of the position of each axis of the manipulator is effected by the position detecting means 10 constituted by an encoder or the like mounted on a motor shaft.

A command position of each axis of the manipulator is sent by the position commanding means 11.

A positional deviation which is determined as a difference between a position signal output by the position detecting means 10 and a command position output by the position commanding means 11 is calculated by the positional deviation detecting means 12.

In this embodiment, adjustment of the force control and the position control is effected by adjusting the virtual spring constant. That is, when the virtual spring constant KH is large (the compliance becomes small), the position control is effected, while when the virtual spring constant KH is small (the compliance becomes large), the force control is effected. The virtual spring constant KH is set by the tool coordinate system. The positional deviation-torque converting means 13 converts the virtual spring constant KH set by the tool coordinate system to a virtual spring constant $K\theta$ in each axis coordinate system of the manipulator, multiplies the spring constant $K\theta$ by the positional deviation signal output from the positional deviation detecting means 12, and converts the positional deviation to a force or moment, or both, corresponding to the positional deviation.

The velocity detecting means 14 detects the velocity of each axis of the manipulator, and this velocity may be determined by differentiating a position signal obtained by the position detecting means 10.

The velocity-torque converting means 15 converts the velocity feedback gain set by the tool coordinate system to a velocity feedback gain at each joint of the manipulator, and multiplies the converted velocity feedback gain by a velocity signal output from the velocity detecting means 14 so as to convert the velocity to a force or moment, or both, corresponding to the velocity.

The feedback compensation computing means 16 adds the force command or moment command, or both, output from the command-torque converting means 9 and the force command or moment command, or both, corresponding to the positional deviation output from the positional deviation-torque converting means 13, subtracts the force signal or moment signal, or both, output from the output-torque converting means 6 and the force signal or moment signal, or both, corresponding to the velocity output from the velocity-torque converting means 15, and effects arithmetic processing such as proportional processing and integral processing in which gains are Kp and Ki, respectively, with respect to that difference so as to obtain a command value of the force or moment, or both, for the driving means of each axis of the manipulator.

As for the arithmetic processing provided for this difference, it is possible to effect proportional, integral, and differential processing, and phase compensation may be added, as required.

As described above, the force feedback gain not only increases the degree of separation between the force control and the position control but also has the effect of setting the gain of the force loop independently of the position loop. That is, in the case of the proportional gain Kp which is multiplied after the addition of the position loop and the force loop, the respective gains of the position loop and the force loop cannot be set independently, but, in the case of the force feedback gain Kffb, it is possible to set the gain of the force loop alone. Meanwhile, as for the virtual spring constant KH is capable of setting the gain of the position loop alone.

Generally, in the case of the force loop and the position loop, their optimum loop gains differ, but if the two loop gains are set simultaneously with only the proportional gain Kp, the upper limit of the gain of the overall system is restrained by either one of the loop gains which becomes unstable first, and there is leeway in the other loop gain which does not become unstable.

Accordingly, in cases where there is leeway in the loop gain of the force loop, it is possible to improve the response characteristics of the force loop.

Thus, the upper limit of the force feedback gain is not to be restricted to 1.

Operation expressions of this control system are expressed below. It should be noted that a description will be given below of a case where both the force and moment are used.

If it is assumed that a force and moment necessary for driving the manipulator in accordance with command values is Fc (tool coordinate system, vector), then Fc becomes a sum of a force and moment command Fi (tool coordinate system, vector) output by the command force variable-gain computing means 8, a value obtained by multiplying a difference between a targeted position Pi (world coordinate system) and a present position Po (world coordinate system), Pi−Po (tool coordinate system), by a virtual spring constant KH (tool coordinate system), and a value obtained by multiplying a velocity Ṗo (tool coordinate system) by a velocity feedback gain KvH (tool coordinate system), so that we have $$Fc = Fi + KH(Pi - Po) - KvH \cdot \dot{P}o \qquad (3)$$

Here, an inertia term is ignored. Fc is converted to a torque $\tau c$ of each axis of the manipulator. If the Jacobian matrix of the manipulator is assumed to be J, $$\tau c = J^T Fc = J^T Fi + J^T KH(Pi - Po) - J^T KvH \cdot \dot{P}o \qquad (4)$$

where $T$ indicates a transposed matrix. In addition, it is possible to effect an approximation by using a targeted value $\theta i$ of each axis of the manipulator and a present value $\theta o$ of each axis of the manipulator as follows:

$$Pi - Po = \Delta P = J\Delta\theta = J(\theta i - \theta o) \qquad (5)$$

$$\dot{P}o = J \cdot \dot{\theta}o \qquad (6)$$

By substituting Formulae (5) and (6) for Formula (4), we have $$\tau c = J^T Fc = J^T Fi + J^T KHJ \cdot (\theta i - \theta o) - J^T KvHJ \cdot \dot{\theta}o \qquad (7)$$

Here, if it is assumed that $$\tau i = J^T Fi \quad (8)$$

$$K\theta = J^T KHJ \quad (9)$$

$$Kv\theta = J^T KvHJ \quad (10)$$

then, $$\tau c = \tau i + K\theta(\theta i - \theta o) - Kv\theta \cdot \dot{\theta}o \quad (11)$$

where $\tau i$ is a torque command value (at the level of each axis of the manipulator), $K\theta$ is a virtual spring constant (at the level of each axis of the manipulator), and $Kv\theta$ is a velocity feedback gain (at the level of each axis of the manipulator). Thus it is possible to employ an angle and angular velocity for the level of each axis of the manipulator.

The positional deviation-torque converting means 13 conducts the portion of $K\theta$ ($\theta i - \theta o$) of Formula (11), while the velocity-torque converting means 15 effects the computation of the portion of $Kv\theta \cdot \dot{\theta}o$ of Formula (11).

By assuming the output of the hand force variable-gain computing means 5 as Fo, the output-torque converting means 6 executes the operation:

$$\tau o = J^T Fo$$

By assuming the output of the command force variable-gain computing means 8 as Fi, the command-torque converting means 9 effects the operation:

$$\tau i = J^T Fi$$

The servo system of each axis of the manipulator forms a torque loop, and the feedback compensation computing means determines through addition/subtraction processing a torque command value $\tau c$ for each axis of the manipulator in accordance with Formula (11) by using the outputs of the respective means for command torque conversion, positional deviation torque conversion, and velocity torque conversion, and effects a feedback control operation so that the output torque $\tau o$ of each joint of the manipulator obtained by the output-torque converting means 6 coincides with $\tau c$. In the feedback control operation, it is possible to effect proportional and integral control. It is further possible to add phase compensation or the like, as required. In addition, a gravity torque compensation Cg corresponding to the position and posture of the manipulator can also be added by providing a gravity torque compensating means 19 and a adding means 20.

In this control system, since the inertia term is ignored, this error may adversely affect the control system. However, as the response characteristics of the manipulator, a level which is approximately the same as that of a human being is required, and if the manipulator is to be moved at such a degree of velocity, the effect of the inertia term is expected to be small, so it can be neglected. In addition, it is possible to reduce the computing time by not calculating the inertia term. However, the negligence of the inertia term is not an essential condition of the present invention, and the calculation of the inertia term may be added in the case of a high-speed operation or when there is leeway in the computing capability.

The result of computation obtained by the feedback compensation operation becomes a command value of at least one of the force or moment for the driving means of the manipulator. This command value is imparted by being converted to a motor current value as a current command value for a motor when a motor driver and a motor are used as driving means. The motor drives the arm section of each joint of the manipulator through a speed reducer, allowing the manipulator to finally effect a desired motion. A signal representative of the result of motion of the manipulator is detected by the position detecting means and the force detecting means, and is input as a feedback signal to the necessary computing means that follows, so as to effect repeated computation.

Figure 7:
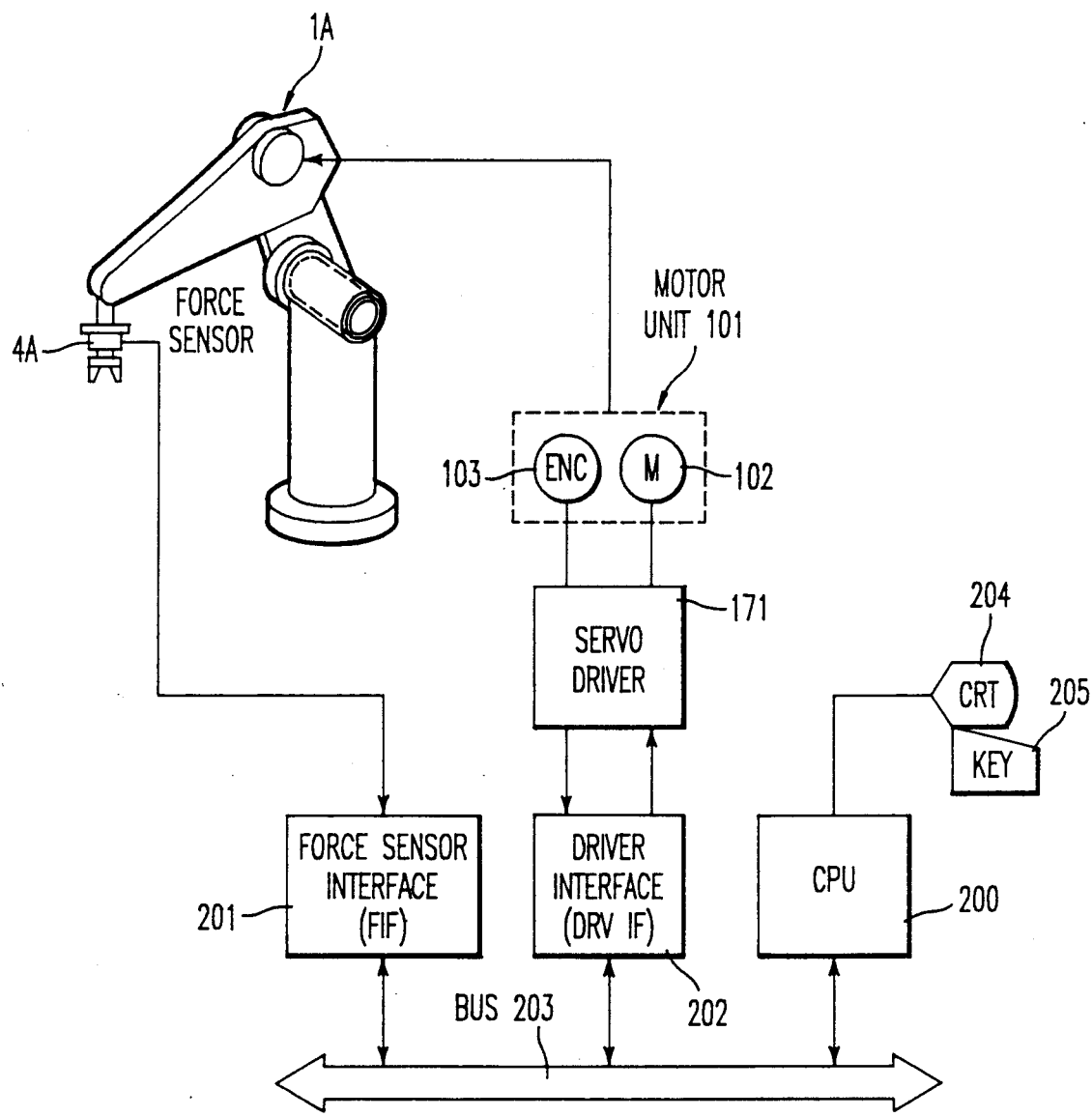
FIG. 7 is a block diagram illustrating a configuration of hardware.

FIG. 7 illustrates an example of a configuration of hardware. Reference character 1A denotes a 6-axis manipulator; 4A, a 6-axis force sensor; 102, a motor for each joint; 103, an encoder for detecting the position of each joint; and 171, a motor driver for driving the motor of each joint. The computation for control is effected by a microcomputer 200 which is provided with a keyboard 205. By operating this keyboard, the user is capable of setting virtual spring constants, various coefficients, a targeted force, and a targeted position that are necessary for the operation of the robot.

An interface between the microcomputer 200 on the one hand, and the motor driver 171 and the encoder 103 on the other, is effected by a driver interface board 202. An interface with the 6-axis force sensor 4A is effected by a force sensor interface board 201. Communication between the microcomputer 200 on the one hand, and the driver interface board 202 and the force sensor interface board 201 is effected via a computer bus 203.

In addition, an arrangement may be alternatively adopted in which the command force variable-gain computing means 8 and the command-torque converting means 9 are constituted by a targeted torque computing means for computing a torque command value of each joint by multiplying an output of the force commanding means 7 by a signal (corresponding to Kffb·$J^T$) whose value becomes small in correspondence with the magnitude of a virtual spring constant set by the tool coordinate system; the hand force variable-gain computing means 5 and the output-torque converting means 6 are constituted by an output torque computing means for computing an output torque of each joint by multiplying an output of the force detecting means by the signal (corresponding to Kffb·$J^T$) whose value becomes small in correspondence with the magnitude of the virtual spring constant; and the positional deviation detecting means 12 and the positional deviation-torque converting means 13 are constituted by a position command computing means for computing a position command torque of each joint by multiplying a positional deviation obtained from outputs of the position commanding means 11 and the position detecting means 10 by a signal (corresponding to $K\theta$) corresponding to the magnitude of the virtual spring constant. The aforementioned signal whose value becomes small in correspondence with the magnitude of the virtual spring constant can be determined on the basis of a signal (corresponding to Kffb) whose upper limit value is greater than 1. The signal whose upper limit value is greater than 1 may be realized through a gain, but may be set to a value other than the same.

If the velocity detecting means 14 is further provided, the feedback compensation computing means computes the velocity torque of each joint by effecting a conversion to at least one of a force and moment corresponding to the velocity of each joint detected, and also effects feedback control of the manipulator driving means in such a manner that an output of the output torque computing means will coincide with a value in which the velocity torque is subtracted from a sum of outputs of the targeted torque computing means and the position command computing means.

What is claimed is:

1. An apparatus for effecting coordinated position/force control for a manipulator, comprising:

manipulator driving means for driving each joint of said manipulator;

force detecting means for detecting in a tool coordinate system at least one of a force and moment which said manipulator receives from an external environment;

hand force variable-gain computing means for providing arithmetic processing for changing a gain in response to a degree of coordination between a position and a force with respect to an output of said force detecting means;

output-torque converting means for converting an output of said hand force variable-gain computing means to at least one of the force and moment in each joint coordinate system of said manipulator;

force commanding means for sending a force command signal in which at least one of the force and moment is expressed by the tool coordinate system;

command force variable gain computing means for providing arithmetic processing for changing the gain in response to a degree of coordination between the position and the force with respect to a force command signal sent from said force commanding means;

command-torque converting means for converting an output of said command force variable gain computing means to at least one of the force and moment in each joint coordinate system of said manipulator;

position detecting for detecting the position of each joint of said manipulator;

position commanding means for sending a command position of each joint of said manipulator;

positional deviation detecting means for detecting a positional deviation which is a difference between the position detected by the position detecting means and the command position sent by said position commanding means;

positional deviation-torque converting means for converting a virtual spring constant set by the tool coordinate system in response to a degree of coordination between the position and the force to a virtual spring constant in each joint coordinate system of said manipulator, and for converting the positional deviation to at least one of the force and moment corresponding to the positional deviation on the basis of the converted virtual spring constant and the positional deviation detected by said positional deviation detecting means; and feedback compensation computing means for computing a command value for at least one of the force and moment for said manipulator driving means on the basis of at least one of the force and moment converted by said command-torque converting means, at least one of the force and moment converted by said positional deviation-torque converting means, and at least one of the force and moment converted by said output-torque converting means.

2. An apparatus for effecting coordinated position/force control for a manipulator according to claim 1, further comprising:

output filtering computing means interposed between said force detecting means and said hand force variable-gain computing means and adapted to allow only a low-frequency component of the output of said force detecting means to be passed; and a force command filtering computing means interposed between said force commanding means and said command force variable-gain computing means and adapted to allow only a low-frequency component of the output of said force commanding means to be passed.

3. An apparatus for effecting coordinated position/force control for a manipulator according to claim 2, further comprising:

velocity detecting means for detecting a velocity of each joint of said manipulator; and velocity-torque converting means for converting a velocity feedback gain set by the tool coordinate system to a velocity feedback gain at each joint of said manipulator, and converting the velocity to at least one of the force and moment corresponding to the velocity on the basis of the converted velocity feedback gain and the velocity detected by said velocity detecting means, wherein said feedback compensation computing means is adapted to compute a command value of at least one of the force and moment for said manipulator driving means on the basis of at least one of the force and moment converted by said command-torque converting means, at least one of the force and moment converted by said positional deviation-torque converting means, at least one of the force and moment converted by said output-torque converting means, and at least one of the force and moment converted by said velocity-torque converting means.

4. An apparatus for effecting coordinated position/force control for a manipulator according to claim 3, wherein said velocity-torque converting means effects a conversion to at least one of the force and moment corresponding to the velocity by multiplying the velocity feedback gain set by the tool coordinate system, the velocity, a Jacobian transposed matrix, and a Jacobian matrix.

5. An apparatus for effecting coordinated position/force control for a manipulator according to claim 3, wherein said feedback compensation computing means effects feedback control such that a difference in which at least one of the force and moment converted by said velocity-torque converting means is subtracted from a sum of at least one of the force and moment converted by said command-torque converting means and at least one of the force and moment converted by said positional deviation-torque converting means coincides with at least one of the force and moment converted by said output-torque converting means.

6. An apparatus for effecting coordinated position/force control for a manipulator according to claim 3, wherein said feedback compensation computing means comprises:

adding/subtracting means for subtracting a sum of at least one of the force and moment converted by said output-torque converting means and at least one of the force and moment converted by said velocity-torque converting means from a sum of at least one of the force and moment converted by said command-torque converting means and at least one of the force and moment converted by said positional deviation-torque converting means; and proportional/integral computing means for effecting either one of proportional and integral processing and proportional, integral and differential processing with respect to an output of said adding/subtracting means.

7. An apparatus for effecting coordinated position/force control for a manipulator according to claim 1, further comprising:

velocity detecting means for detecting a velocity of each joint of said manipulator; and velocity-torque converting means for converting a velocity feedback gain set by the tool coordinate system to a velocity feedback gain at each joint of said manipulator, and converting the velocity to at least one of the force and moment corresponding to the velocity on the basis of the converted velocity feedback gain and the velocity detected by said velocity detecting means, wherein said feedback compensation computing means is adapted to compute a command value of at least one of the force and moment for said manipulator driving means on the basis of at least one of the force and moment converted by said command-torque converting means, at least one of the force and moment converted by said positional deviation-torque converting means, at least one of the force and moment converted by said output-torque converting means, and at least one of the force and moment converted by said velocity-torque converting means.

8. An apparatus for effecting coordinated position/force control for a manipulator according to claim 7, wherein said velocity-torque converting means effects a conversion to at least one of the force and moment corresponding to the velocity by multiplying the velocity feedback gain set by the tool coordinate system, the velocity, a Jacobian transposed matrix, and a Jacobian matrix.

9. An apparatus for effecting coordinated position/force control for a manipulator according to claim 7, wherein said feedback compensation computing means effects feedback control such that a difference in which at least one of the force and moment converted by said velocity-torque converting means is subtracted from a sum of at least one of the force and moment converted by said command-torque converting means and at least one of the force and moment converted by said positional deviation-torque converting means coincides with at least one of the force and moment converted by said output-torque converting means.

10. An apparatus for effecting coordinated position/force control for a manipulator according to claim 7, wherein said feedback compensation computing means comprises:

adding/subtracting means for subtracting a sum of at least one of the force and moment converted by said output-torque converting means and at least one of the force and moment converted by said velocity-torque converting means from a sum of at least one of the force and moment converted by said command-torque converting means and at least one of the force and moment converted by said positional deviation-torque converting means; and proportional/integral computing means for effecting either one of proportional and integral processing and proportional, integral and differential processing with respect to an output of said adding/subtracting means.

11. An apparatus for effecting coordinated position/force control for a manipulator according to claim 1, wherein said hand force variable-gain computing means and said command force variable-gain computing means change the gain to a small level as the virtual spring constant set by the tool coordinate system becomes large in response to a degree of coordination between the position and the force and to a large level as the virtual spring constant becomes small.

12. An apparatus for effecting coordinated position/force control for a manipulator according to claim 11, wherein the virtual spring constant is made small with respect to a component for which force control is to be effected, and the virtual spring constant is made large with respect to a component for which positional control is to be effected.

13. An apparatus for effecting coordinated position/force control for a manipulator according to claim 1, wherein said hand force variable-gain computing means and said command force variable-gain computing means change the gain in accordance with the following formula:

$$Kffb = A \cdot FBFCT / (KH + FBFCT)$$

where Kffb is a feedback gain; A, a constant; KH, a virtual spring constant which is made small with respect to a component for which force control is to be effected and is made large with respect to a component for which positional control is to be effected, and which is set by the tool coordinate system; and FBFCT is a separation parameter for determining a degree of separation between the force control and the position control.

14. An apparatus for effecting coordinated position/force control for a manipulator according to claim 1, said output-torque converting means and said command-torque converting means respectively multiply an output of said hand force variable-gain computing means and an output of said command force variable-gain computing means by a Jacobian transposed matrix so as to convert said outputs to at least one of the force and moment in each joint coordinate system of said manipulator.

15. An apparatus for effecting coordinated position/force control for a manipulator according to claim 1, wherein said positional deviation-torque converting means effects a conversion to at least one of the force and moment corresponding to the positional deviation by multiplying the virtual spring constant set by the tool coordinate system, the positional deviation, a Jacobean transposed matrix, and a Jacobean matrix.

16. An apparatus for effecting coordinated position/force control for a manipulator according to claim 1, wherein said feedback compensation computing means effects feedback control such that a sum of at least one of the force and moment converted by said command-torque converting means and at least one of the force and moment converted by said positional deviation-torque converting means coincides with at least one of the force and moment converted by said output-torque converting means.

17. An apparatus for effecting coordinated position/force control for a manipulator according to claim 1, wherein said feedback compensation computing means comprises:
 adding/subtracting means for subtracting at least one of the force and moment converted by said output-torque converting means from a sum of at least one of the force and moment converted by said command-torque converting means and at least one of the force and moment converted by said positional deviation-torque converting means; and
 proportional/integral computing means for effecting either one of proportional and integral processing and proportional, integral and differential processing with respect to an output of said adding/subtracting means.

18. An apparatus for effecting coordinated position/force control for a manipulator according to claim 17, wherein said feedback compensation computing means further comprises:
 gravity torque compensating means for outputting a signal for preventing a change in at least one of the force and moment due to gravity; and
 adding means for adding an output of said proportional/integral computing means and an output of said gravity torque compensating means.

19. An apparatus for effecting coordinated position/force control for a manipulator, comprising:
 manipulator driving means for driving each joint of said manipulator;
 force detecting means for detecting in a tool coordinate system at least one of a force and moment which said manipulator receives from an external environment;
 position detecting means for detecting a present position Po of each joint of said manipulator;
 position commanding means for sending a command position Pi of each joint of said manipulator;
 force commanding means for sending a force command signal in which at least one of the force and moment is expressed by the tool coordinate system; and
 controlling means adapted to compute a value Fo in which a signal exceeding a necessary frequency bandwidth is cut off from an output of said force detecting means and which is multiplied by a gain inversely proportional to a virtual spring constant KH set by the tool coordinate system as well as a value Fi in which a signal exceeding the frequency bandwidth is cut off from an output of said force commanding means and which is multiplied by the gain, said controlling means being also adapted to compute a torque command value $\tau c$ for said manipulator driving means in accordance with the following formula and effect feedback control of said manipulator driving means in such a manner that an output torque $\tau o$ obtained on the basis of the output of said detecting means coincides with the torque command value $\tau c$:

$$\tau c = \tau i + K\theta \cdot (\theta i - \theta o)$$

where, when a Jacobian matrix is assumed to be J and a Jacobean transposed matrix $J^T$,
 $\tau i$ is a torque command value defined by $J^T Fi$, $K\theta$ is a virtual spring constant at each joint coordinate system defined by $J^T KHJ$,
 $(\theta i - \theta o)$ is a difference between a present angle $\theta o$ and a command angle $\theta i$ of an axis of each joint of said manipulator satisfying $J \cdot (\theta i - \theta o) = Pi - Po$, and
 $\tau o$ is given by $J^T Fo$.

20. An apparatus for effecting coordinated position/force control for a manipulator according to claim 19, further comprising velocity detecting means for detecting a velocity $\dot{P}o$ of each joint of said manipulator, and said controlling means computes the torque command value $\tau c$ in accordance with the following formula:

$$\tau c = \tau i + K\theta(\theta i - \theta o) - Kv\theta \cdot \dot{\theta}o$$

where $Kv\theta$ is a velocity feedback gain at each joint of said manipulator defined by $J^T KvHJ$ if a velocity feedback gain set by the tool coordinate system is assumed to be $KvH$, and $\dot{\theta}o$ is an angular velocity of an axis of each joint of said manipulator which satisfies $\dot{P}o = J \cdot \dot{\theta}o$.

21. An apparatus for effecting coordinated position/force control for a manipulator, comprising:
 manipulator driving means for driving each joint of said manipulator;
 force detecting means for detecting in a tool coordinate system at least one of a force and moment which said manipulator receives from an external environment;
 position detecting means for detecting a present position of each joint of said manipulator;
 position commanding means for sending a command position of each joint of said manipulator;
 force commanding means for sending a force command signal in which at least one of the force and moment is expressed by the tool coordinate system;
 targeted torque computing means for computing a torque command value of each joint by multiplying an output of said force commanding means by a signal whose value becomes small in correspondence with the magnitude of a virtual spring constant set by the tool coordinate system;
 output torque computing means for computing an output torque of each joint by multiplying an output of said force detecting means by the signal whose value becomes small in correspondence with the magnitude of the virtual spring constant;
 position command computing means for computing a position command torque of each joint by multiplying a positional deviation obtained from outputs of said position commanding means and said position detecting means by a signal corresponding to the magnitude of the virtual spring constant; and
 feedback compensation computing means for effecting feedback control of said manipulator driving means in such a manner that a sum of outputs of said targeted torque computing means and said position command computing means will coincide with an output of said output torque computing means.

22. An apparatus for effecting coordinated position/force control for a manipulator according to claim 21, wherein the signal whose value becomes small in correspondence with the magnitude of the virtual spring constant set by the tool coordinate system in said targeted torque computing means and said output torque computing means is determined on the basis of a signal whose upper limit value is greater than 1.

23. An apparatus for effecting coordinated position/force control for a manipulator according to claim 22, further comprising velocity detecting means for detecting the velocity of each joint of said manipulator, said feedback compensation computing means being adapted to compute the velocity torque of each joint by effecting a conversion to at least one of a force and moment corresponding to the velocity of each joint detected, and also adapted to effect feedback control of said manipulator driving means in such a manner that the output of said output torque computing means will coincide with a value in which the velocity torque is subtracted from the sum of outputs of said targeted torque computing means and said position command computing means.

* * * * *